(12) United States Patent
Kim et al.

(10) Patent No.: US 8,831,654 B2
(45) Date of Patent: Sep. 9, 2014

(54) APPARATUS AND METHOD OF MULTI CELL COOPERATION IN WIRELESS COMMUNICATION SYSTEM

(75) Inventors: Hyung Tae Kim, Anyang-si (KR); Han Byul Seo, Anyang-si (KR); Byoung Hoon Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 438 days.

(21) Appl. No.: 13/384,664

(22) PCT Filed: Jul. 29, 2010

(86) PCT No.: PCT/KR2010/004975
§ 371 (c)(1),
(2), (4) Date: Jan. 18, 2012

(87) PCT Pub. No.: WO2011/014014
PCT Pub. Date: Feb. 3, 2011

(65) Prior Publication Data
US 2012/0157140 A1    Jun. 21, 2012

Related U.S. Application Data

(60) Provisional application No. 61/230,098, filed on Jul. 30, 2009, provisional application No. 61/355,146, filed on Jun. 16, 2010, provisional application No. 61/358,943, filed on Jun. 28, 2010.

(30) Foreign Application Priority Data

Jul. 15, 2010 (KR) .................. 10-2010-0068271

(51) Int. Cl.
*H04B 15/00* (2006.01)
*H04B 7/06* (2006.01)
*H04B 7/02* (2006.01)

(52) U.S. Cl.
CPC .............. *H04B 7/0634* (2013.01); *H04B 7/024* (2013.01)
USPC ..... 455/501; 455/63.1; 455/67.13; 455/114.2

(58) Field of Classification Search
USPC .......................... 455/63.1, 67.13, 501, 114.2
See application file for complete search history.

(56) References Cited

U.S. PATENT DOCUMENTS

| | | | |
|---|---|---|---|
| 6,665,521 B1 | 12/2003 | Gorday et al. | |
| 2008/0096488 A1* | 4/2008 | Cho et al. ......................... | 455/69 |
| 2008/0233902 A1* | 9/2008 | Pan et al. .................... | 455/114.3 |
| 2009/0323849 A1* | 12/2009 | Bala et al. ..................... | 375/267 |
| 2010/0091678 A1* | 4/2010 | Chen et al. .................... | 370/252 |
| 2010/0238821 A1* | 9/2010 | Liu et al. ....................... | 370/252 |
| 2010/0285762 A1* | 11/2010 | Ko et al. .................... | 455/127.1 |

FOREIGN PATENT DOCUMENTS

| KR | 10-2006-0081755 A | 7/2006 |
|---|---|---|
| WO | WO 2006/063138 A2 | 6/2006 |

* cited by examiner

*Primary Examiner* — Raymond Dean
(74) *Attorney, Agent, or Firm* — Birch, Stewart, Kolasch & Birch, LLP

(57) ABSTRACT

An apparatus and method of multi cell cooperation is provided. The user equipment receives transmission beam forming information from a first cooperative cell, generates serving cell feedback information and cooperative cell feedback information on the basis of the transmission beam forming information, transmits the serving cell feedback information to a serving cell, and transmits the cooperative cell feedback information to a second cooperative cell.

12 Claims, 9 Drawing Sheets

APPARATUS AND METHOD OF MULTI CELL COOPERATION IN WIRELESS COMMUNICATION SYSTEM

CROSS REFERENCE TO RELATED APPLICATIONS

This application is the National Phase of PCT/KR2010/004975 filed on Jul. 29, 2010, which claims the benefit under 35 U.S.C. 119(e) of U.S. Provisional Application Nos. 61/230,098; 61/355,146 and 61/358,943, filed on Jul. 30, 2009; Jun. 16, 2010 and Jun. 28, 2010; respectively, and claims priority under 35 U.S.C. 119 (a) to Patent Application No. 10-2010-0068271 filed in Republic of Korea on Jul. 15, 2010, all of which are hereby expressly incorporated by reference into the present application.

TECHNICAL FIELD

The present invention relates to wireless communication, in more detail, an apparatus and method for multi cell cooperation in a wireless communication system.

BACKGROUND ART

Multi cell cooperation has been proposed to increase performance and communication capacity of wireless communication systems. The multi cell cooperation is also called CoMP (cooperative multiple point transmission and reception). The CoMP is called MIMO (Multiple Input Multiple Output) in a meaning that transmitting antennas are like a multiple antenna system distributed in a plurality of cells, because the antennas disposed of each base station does not independently operate, but operate in consideration of users in other cells.

In the CoMP, there are a beam avoidance technique that mitigates interference with a user at the cell interface by cooperation of adjacent cells and a joint transmission technique that transmits the same data by cooperation of adjacent cells.

In particular, in the next wireless communication systems, such as IEEE (Institute of Electrical and Electronics Engineers) 802.16m or 3GPP (3rd Generation Partnership Project) LTE (long term evolution)-Advanced, it has been an important requirement to improve performance of users who are positioned at a cell interface and significantly interfered with adjacent cells. The beam avoidance technique has been considered to remove this problem.

The beam avoidance technique mitigates interference from cooperative cells by sharing channel information between the cooperative cells. In general, the beam avoidance controls the interference by limiting PMI (Precoding Matrix Indicator) that cooperative cells can select.

According to R1-091252, "Estimation of extended PMI feedback signaling required for user intra-cell and inter-cell coordination", disclosed in April, 2009, a user determines the PMI and CQI (Channel Quality Indicator) of a serving cell, and then the PMI of a cooperative cell having the smallest interference and the increase of the CQI when the cooperative cell finally uses the PMI is fed-back to the cooperative cell. On the contrary, a method of feed-backing the PMI of a cooperative cell having the largest interference and the increase of the CQI when the cooperative cell does not finally uses the PMI to the cooperative cell.

It is required to share various information between a serving cell and cooperative cells to achieve the CoMP. Various feedback information between a user equipment and a serving cell and/or a user equipment and a cooperative cell is needed to share information.

However, signaling overhead may be caused, when large amount feedback information is used for the CoMP.

A multi cell cooperation technique that can reduce feedback overhead while mitigating interference is required.

DISCLOSURE OF INVENTION

Technical Problem

The present invention provides a method and apparatus of multi cell cooperation that reduces feedback overhead.

Solution to Problem

In an aspect, a method of multi cell cooperation in a user equipment (UE) is provided. In this method, the UE receives transmission beam forming information from a first cooperative cell, generates serving cell feedback information and cooperative cell feedback information on the basis of the transmission beam forming information, transmits the serving cell feedback information to a serving cell, and transmits the cooperative cell feedback information to a second cooperative cell.

The transmission beam forming information may include information on a first precoding matrix used by the first cooperative cell.

The cooperative cell feedback information may include information on a second precoding matrix selected such that a first channel direction matches with a second channel direction, the first channel direction being defined between the second cooperative cell and the UE, the second channel direction being defined between the first cooperative cell and the UE, and wherein the first precoding matrix is applied to the first cooperative cell.

The serving cell feedback information may include information on a precoding matrix determined to have the highest signal to interference and noise ratio (SINR) when the first precoding matrix and the second precoding matrix are applied.

The determined precoding matrix may be determined to exist in a null space of a channel between the UE and the first cooperative cell where the first precoding matrix is applied.

The serving cell feedback information may include information on a precoding matrix determined to have the highest SINR, when the first precoding matrix is applied.

The determined precoding matrix may be determined to exist in a null space of a channel between the UE and the first cooperative cell where the first precoding matrix is applied.

The transmission beam forming information may be transmitted through a Physical Downlink Control Channel (PDCCH).

The transmission beam forming information may be transmitted through a precoded reference signal where a first precoding matrix used by the first cooperative cell is applied.

In another aspect, an user equipment includes a transceiver configured to receive transmission beam forming information from a first cooperative cell, transmit serving cell feedback information to a serving cell, and transmit cooperative cell feedback information to a second cooperative cell; and a feedback information generator configured to generate the serving cell feedback information and the cooperative cell feedback information on the basis of the transmission beam forming information.

Advantageous Effects of Invention

It is possible to reduce interference to a user at a cell interface from adjacent cells. Further, efficient generation and transmission of feedback information for the CoMP are proposed.

MODE FOR THE INVENTION

A user equipment (UE) may be fixed or mobile and may be called other names, such as MS (mobile station), MT (mobile terminal), UT (user terminal), SS (subscriber station), wireless device, PDA (personal digital assistant), wireless modem, and handheld device.

A base station (BS) usually implies a fixed station communicates with UE and may be called other names, such as eNB (evolved-NodeB), BTS (Base Transceiver System), and access point.

Each BS provides a communication service for a specific geographical area (generally called a cell). The cell may be divided into a plurality of regions (called sectors).

Hereinafter, downlink (DL) implies communication from a BS to a UE and uplink (UL) implies communication from a BS to a UE. A transmitter may be a part of a BS and a receiver may be a part of a UE in the downlink. A transmitter may be a part of a UE and a receiver may be a part of a BS in the uplink.

A serving cell is a cell that currently provides a UE with a service. A cooperative cell is a cell adjacent a serving cell and cooperating for the CoMP (cooperative multiple point transmission and reception).

The cooperative cell is divided into an amicable cooperative cell and a non-amicable cooperative cell. The amicable cooperative cell is a cell where beam avoidance for the CoMP can be applied first. The non-amicable cooperative cell is a cell where the beam avoidance for the CoMP is not applied or limitedly applied, in consideration of the beam forming first for a user in the non-amicable cooperative cell.

Figure 1:
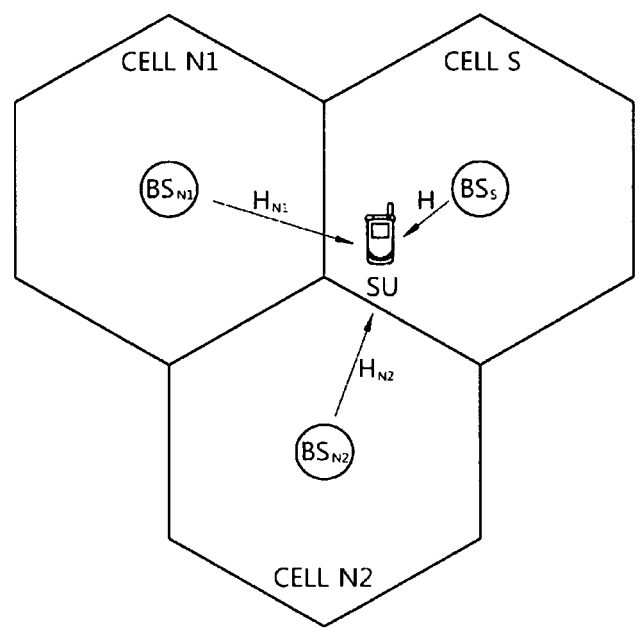
FIG. 1 is a diagram showing an example of multi cell cooperation.

FIG. 1 is a diagram showing an example of multi cell cooperation.

A cell S is a serving cell of a user equipment. A SU denotes a UE of the serving cell. A cell N1 and a cell N2 are cooperative cells. $BS_S$ indicates a BS of the cell S, $BS_{N1}$ indicates a BS of the cell N1, and $BS_{N2}$ indicates a BS of the cell N2. Although each BS has one cell, it may have a plurality of cells. The number of transmitting antennas of the BSS is $Nt_S$, the number of transmitting antennas of the $BS_{N1}$ is $Nt_{N1}$, and the number of transmitting antennas of the $BS_{N2}$ is $Nt_{N2}$.

Assume that the cell N1 is a non-amicable cooperative cell and the cell N2 is an amicable cooperative cell. Assume that beam avoidance for reducing interference of the SU is not available for the non-amicable cooperative cell N1 to ensure QoS (Quality of Service) of its own transmission signal.

The number of receiving antennas of the SU is Nr, a channel between the cell S and the SU is an Nr×Nts matrix H, a channel between the cell N1 and the SU is an $Nr \times Nt_{N1}$ matrix $H_{N1}$, and a channel between the cell N2 and the SU is an $Nr \times Nt_{N2}$ matrix $H_{N2}$.

Assume that the number of transport stream of the cell S is L and the number of transport stream of N2 is $L_{N2}$. Assume that the number of transport stream determined to ensure QoS of the cell N1 is $L_{N1}$. The total number of transport stream of the cell N2 may be larger than $L_{N1}$.

Hereafter, the beam forming matrix may be referred to as a precoding matrix. The beam forming matrix may be a beam forming vector, when having one row or column.

The UE in the cells receives downlink data while interfering with each other at the same time and the same frequency band (referred to as cooperative wireless source).

Figure 2:
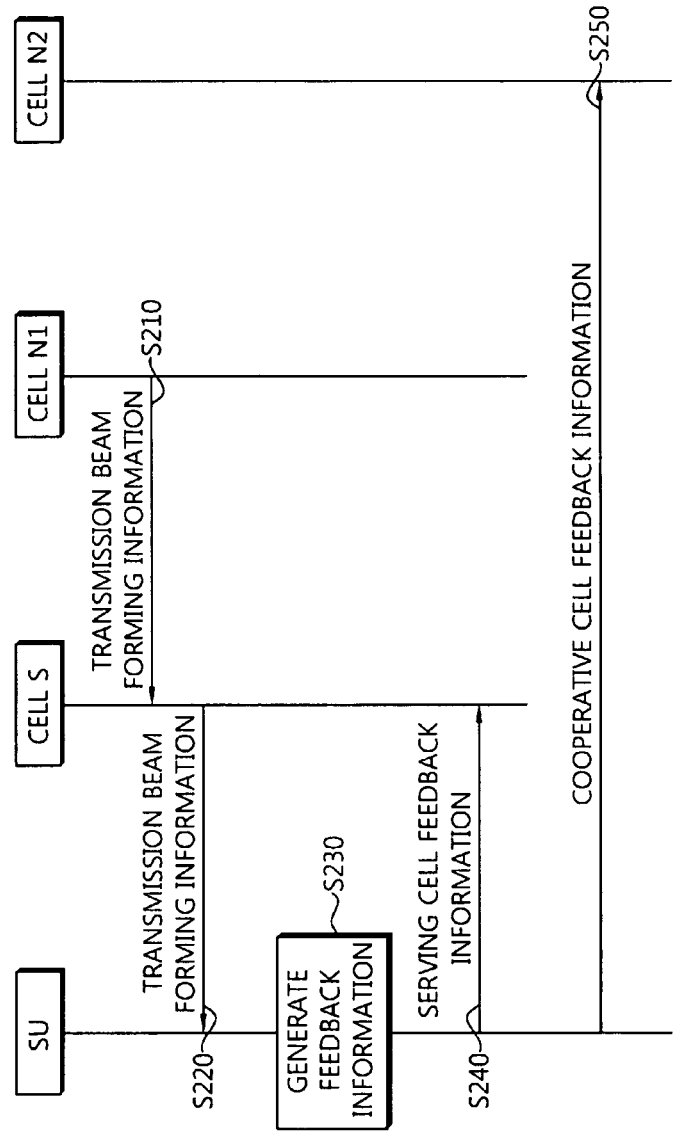
FIG. 2 is a diagram illustrating a method of multi cell cooperation according to an embodiment of the present invention.

FIG. 2 is a diagram illustrating a method of multi cell cooperation according to an embodiment of the present invention.

The non-amicable cooperative cell N1 reports transmission beam forming information to use to the serving cell S (S210). The transmission beam forming information is described below, but includes a transmission beam forming matrix $V_{N1}$ that the non-amicable cooperative cell N1 may use.

The SU of the serving cell acquires the transmission beam forming information from the cell S through a wireless channel (S220). If a wireless channel exists between the non-amicable cooperative cell n1 and the SU, the transmission beam forming information may be directly received from the non-amicable cell. Alternatively, when the non-amicable cooperative cell N1 uses the transmission beam forming matrix $V_{N1}$ for a specific time/frequency resource by using a periodic pattern, the SU can receive the pattern and indirectly acquire the transmission beam forming matrix $V_{N1}$.

The SU generates feedback information for the transmission beam forming of the serving cell S and the amicable cooperative cell N2 in consideration of an interference signal received from the cell N1. That is described below.

The SU reports serving cell feedback information to the cell S (S240). For example, the serving cell feedback information may be information on an effective channel between the SU and the cell S.

The SU reports cooperative cell feedback information to the cell N2 (S250). The SU may directly report cooperative cell feedback information to the cell N2, when a wireless channel exists between the SU and the cell N2. Alternatively, the SU can report cooperative cell feedback information to the cell N2 through the cell S. For example, the cooperative cell feedback information may be interference aligned beam index for the cell N2 or information on an effective channel between the SU and the cell N2.

The cell N1 and the cell N2 should know a frequency resource and a time resource for cooperative communication. This is called a cooperative wireless source. The cooperative wireless source may be shared among the cells in various ways.

For an example, in a CN (Core Network) managing the cell N1, cell N2 and cell S, information on the cooperative radio resource may be informed to each cell.

In another example, the information may be determined by the cell N2 and transmitted to the other cells. The information on the frequency resource and the time resource that uses the transmission beam determined by the cell N1 is transmitted to the cell N2 and cell S through a wire channel. The cell S can transmit information on the cooperative radio resource to the SU of the serving cell. Alternatively, the cell N1 can transmit the information to the SU through a wireless channel, when the wireless channel exists between the cell N1 and the SU.

In still another example, the cell S may determines the cooperative radio resource and inform it to the cell N1 and the cell N2 and the SU.

Feedback information can be defined as follows in accordance with which cell's feedback information in the serving cell and the amicable cooperative cell is generated earlier by the SU.

First Embodiment

When Cooperative Cell Feedback Information is Generated Earlier than Serving Cell Feedback Information The SU matches the directions of the interference channels received from the cooperative cells in order to effectively perform interference cancellation through beam forming.

Assume that the transmission beam forming matrix of the cell N2 that the UE acquires is $V_{IA}$. The UE matches the $H_{N2}V_{IA}$ channel direction with the interference channel $H_{N1}V_{N1}$ of the non-amicable cooperative cell as possible as it can, by adjusting the $V_{IA}$. That is, comparing the column vectors of the $H_{N1}V_{N1}$ and $H_{N2}V_{IA}$, an interference aligned beam $V_{IA}$ having the closest matched direction is calculated and it is reported as the cooperative cell feedback information to the cell N2.

For example, a $Nt_{N2} \times L_{N1}$ matrix $V_{IA}$ can be calculated as follows:

MathFigure 1

$$V_{IA} = \arg\max_{W_{N2}^i \in CB(Nt_{N2}, L_{N1})} tr(|((H_{N1}V_{N1})_{No})^H (H_{N2}W_{N2}^i)_{No}|) \quad [\text{Math.1}]$$

where $CB(Nt_{N2}, L_{N1})$ is a codebook having the $Nt_{N2} \times L_{N1}$ matrix $W_{N2}^i$ as the i-th codeword and $(A)_{No}$ is a matrix having the magnitudes of the column vectors of a matrix A are normalized to 1. Hereinafter, the codeword implies one element in a codebook having a plurality of elements.

The cell N2 can determine a transmission beam from $V_{IA}$. The cell N2 can determine the transmission beam forming matrix $V_{N2}$ in a vector space where the column vectors of $V_{IA}$ span, or limit $V_{N2}$ to have the column vectors of $V_{IA}$ and column vectors having correlation of above a threshold $\alpha$, as follows:

MathFigure 2

$$\alpha \leq \sum_{i=1}^{L_{N1}} (V_{IA}(i))^H V_{N2}(l) \quad [\text{Math. 2}]$$

where $1 \leq l \leq L_{N2}$, and $V_{IA}(i)$ and $V_{N2}(l)$ are i-th and l-th column vectors of the matrixes, respectively.

The threshold $\alpha$ may be determined in advance or may be informed to the N2 by the cell S. Although the larger the threshold $\alpha$, the more the limit to the transmission beam of the cell N2 increases, the interference channel direction of the cell N2 that the SU receives matches with the interference channel direction of the cell N1. When the interference channel directions are matched, it is possible to effectively perform interference signal control through beam forming in the serving cell. This is because it is possible to use the other spatial layers, except for some of the spatial layers where interference signals are collected, in spatial layers given by min($Nt_s$, Nr), without interference from the cooperative cell.

After determining the cooperative cell feedback information $V_{IA}$, the UE feedbacks an effective channel that is used for beaming forming by the serving cell and a channel quality indicator (CQI) corresponding to the effective channel, as serving cell feedback information.

The effective channel implies a channel implemented after the receiver performs post process through beam forming. The effective channel can be represented by UHi, where a reception beam forming matrix is U and the channel of the transmitter is Hi.

For the effective channel U*H with respect to the serving cell, a quantized effective channel Hq may be fed-back as serving cell feedback information as given by:

MathFigure 3

$$H_q = Q(U^*H, CB(L, Nt_s)) \quad [\text{Math.3}]$$

where $U^* = \arg\max(f(SINR_1((UH)^H), f(SINR_2((UH)^H), \ldots, f(SINR_L((UH)^H), \|U(l)\| = 1$ and $1 \leq l \leq L$. CB(L, $Nt_s$) is a codebook having a $L \times Nt_s$ matrix $W^i$ as the i-th codeword. U(l) is the l-th row vector of the reception beam forming matrix U of the SU. $A^H$ implies a hermitian matrix of the matrix A. Q(A,B) is a quantization function and outputs a codeword of which the the distance metric with respect to matrix A are the smallest of the codewords in the codebook B as a result value.

For example, the quantization function can be defined as follow:

MathFigure 4

$$Q(A,B) = (\arg\max_{W \in B} tr(|W(A^H)_{No}|) \quad [\text{Math.4}]$$

In the equation 3, U* represents a reception beam forming matrix of the SU that maximizes the objective function f( ), under assumption that the transmitter performs MRC (Maximal Ratio Combining) beam forming.

The objective function f( ) can be defined by one of following equations.

MathFigure 5

$$f(SINR_1((UH)^H), SINR_2((UH)^H), \ldots, SINR_L((UH)^H) = \sum_{l=1}^{L} \log(1 + SINR_l((UH)^H)) \quad [\text{Math. 5}]$$

MathFigure 6

$$f(SINR_1((UH)^H), SINR_2((UH)^H), \ldots, SINR_L((UH)^H)) = \prod_{l=1}^{L} SINR_l((UH)^H) \quad \text{[Math. 6]}$$

MathFigure 7

$$f(SINR_1((UH)^H), SINR_2((UH)^H), \ldots, SINR_L((UH)^H)) = \min(SINR_1((UH)^H), SINR_2((UH)^H), \ldots, SINR_L((UH)^H)) \quad \text{[Math. 7]}$$

When the transmission beam forming matrix of the cell S is V, $SINR_1(V)$ representing the signal to interference and noise ratio (SINR) of the l-th spatial stream of the cell S is calculated as follow:

MathFigure 8

$$SINR_l(V) = \frac{|U(l)HV(l)|^2 \frac{P}{L}}{N_0 + \sum_{k \neq l} |U(l)HV(k)|^2 \frac{P}{L} + \|U(l)H_{N1}V_{N1}\|^2 \frac{P_{N1}}{L_{N1}} + \|U(l)H_{N2}V_{IA}\|^2 \frac{P_{N2}}{L_{N1}}} \quad \text{[Math. 8]}$$

where P, $P_{N1}$, $P_{N2}$ are respectively power of reception signals that the SU receives from the cell S, cell N1, and cell N2. $N_0$ is power of interference and noise from cells except for the cooperative cell. V(l) is a beam forming vector used for l-th spatial stream by the cell S, that is, the l-th column vector of the beam forming matrix V. $V=(UH)^H$ if MRC beam forming is performed for the effective channel. $V_{N1}$ is a beam forming matrix used by the cell N1 and $V_{IA}$ is a beam forming matrix used by the cell N2. U(l) is a reception beam forming vector for the l-th reception spatial stream, that is, the l-th row vector of the reception beam forming matrix U, when the cell S, cell N1, and cell N2 use V, $V_{N1}$, $V_{IA}$ as beam forming matrixes.

To achieve higher SINR, it is possible to find an effective channel from the following equation.

MathFigure 9

$$H_q = \arg\max_{W^i \in CB(L,Nt_s)} (f(SINR_1((W^i)^H), SINR_2((W^i)^H), \ldots, SINR_L((W^i)^H))) \quad \text{[Math.9]}$$

This equation is to find an effective channel that maximizes the objective function by fully searching all the codewords in the codebook for quantizing the effective channel.

when the SU performs MMSE (minimum mean square error) beam forming as a reception beam forming, $U_{MMSE}$ is determined as follows:

MathFigure 10

$$U_{MMSE} = (H(W^i)^H)^H (G)^{-1} \quad \text{[Math.10]}$$

where $G = H(W^i)^H (H(W^i)^H)^H P/L + H_{N1} V_{N1} (H_{N1} V_{N1})^H P_{N1}/L_{N1} + H_{N2} V_{IA} (H_{N2} V_{IA})^H P_{N2}/L_{N1} + N_0 I_{Nr}$.

The following constraint of the reception beam forming matrix U may be optionally added to the process of calculating two effective channels described above.

MathFigure 11

$$UH_{N1}V_{N1} = O \quad \text{[Math.11]}$$

This restrains the reception beam forming matrix of the SU to exist in the null space of the channel $H_{N1}V_{N1}$ where beam forming of the non-amicable cooperative cell N1 is applied. As a result, the cell S can perform communication without interference from the non-amicable cooperative cell N1, and can perform communication with a little interference or without interference from the amicable cooperative cell N2. However, DOF (degree of freedom) of the cell S is decreased as much as the number of column vector of $H_{N1}V_{N1}$, i.e. $L_{N1}$.

When an interference signal is strong enough, it is expected that the performance increase due to interference signal removal is larger than the performance decrease of the cell S due to the loss of DOF, and the performance decrease would not be large, even if DOF is lost as much as $L_{N1}$, when DOF is significantly larger than the number of spatial stream of the cell.

Consequently, the information that the SU feedbacks to the serving cell relates to the CQI used for determining a modulation and coding scheme (MCS) of each spatial stream and the effective channel Hq for transmission beam forming. The CQI can be calculated by appropriate quantization based on the SINR. The serving cell S can use $(Hq)^H$ as a beam forming matrix after acquiring Hq from the SU.

Second Embodiment

When Serving Cell Feedback Information is Generated Earlier than Cooperative Cell Feedback Information The serving cell feedback information is determined similar to the first embodiment. $P_{N2}$ is set to 0 and Hq is determined in equations 3 to 9, because the beam of the amicable cooperative cell N2 is not considered. Thereafter, the operation of the serving cell where Hq is fed-back is the same as the first embodiment.

When the reception beam forming matrix U of the SU is determined in the process of calculating Hq, $H_{q,N2}$ obtained by quantizing $UH_{N2}$ with respect to the cell N2 into $Q(UH_{N2}, CB(L,Nt_{N2}))$ can be calculated. $CB(L,Nt_{N2})$ implies a codebook having the $L \times Nt_{N2}$ matrix $W^i_{N2}$ as the i-th codeword.

The amicable cooperative cell N2 receives $H_{q,N2}$ fed-back from the UE and restrains transmission beam using the $H_{q,N2}$. That is, it restrains the transmission beam to the beam existing in the null space of the row vectors of $H_{q,N2}$ or beam having correlation of below $\epsilon$ with row vectors of $H_{q,N2}$. $\epsilon$ is larger than 0, but close to 0.

CQI of the l-th spatial stream can be calculated from the SINR as given by:

MathFigure 12

$$SINR_l = \frac{|U(l)HH_q^H(l)|^2 \frac{P}{L}}{N_0 + \sum_{k \neq l} |U(l)HH_q^H(k)|^2 \frac{P}{L} + \|U(l)H_{N1}V_{N1}\|^2 \frac{P_{N1}}{L_{N1}} + \|U(l)H_{N2}\text{null}(H_{q,N2})\|^2 \frac{P_{N2}}{Nt_{N2} - L}} \quad \text{[Math. 12]}$$

where $H^H_q$ is a transmission beam forming matrix of the serving cell S and U is a reception beam forming matrix determined in the process of finding $H_q$. $H^H_q(i)$ is the i-th column vector of $H^H_q$ and U(j) is the j-th row vector of U. null($H_{q,N2}$) implies the basis vector in the null space of the row vectors of the L×$Nt_{N2}$ matrix $H_{q,N2}$. If L≥$Nt_{N2}$, SINR is calculated while an interference signal transmitted from the cell N2 is considered as a Gaussian noise.

In order to additionally acquire higher SINR, it is possible to define a reception beam forming matrix UMMSE as follows:

MathFigure 13

$$U_{MMSE}=(HH^H_q)^H(G)^{-1} \quad \text{[Math.13]}$$

where G=$HH^H_q(HH^H_q)^H$ P/L+$H_{N1}V_{N1}(H_{N1}V_{N1})^H$ $P_{N1}$/$L_{N1}$+$H_{N2}$ null($H_{q,N2}$)($H_{N2}$ null($H_{q,N2}$))$^H$ $P_{N2}$/($Nt_{N2}$−L)+$N_0 I_{Nr}$.

Third Embodiment

When Serving Cell Feedback Information and Cooperative Cell Feedback Information are Jointly Generated According to this method, it is possible to expect improved performance by searching all possible combinations of $H_q$ and $H_{q,N2}$, the calculation complexity increases though.

The effective channel $H_q$ of the serving cell and the effective channel $H_{q,N2}$ of the amicable cooperative cell are determined as follow.

MathFigure 14

$$(H_q,H_{q,N2})=\arg\max_{W^i \in CB(L,Nt_s), W^i_{N2} \in CB(L,Nt_{N1})}(f(SINR_1(W^i,W^i_{N2}),SINR_2(W^i,W^i_{N2}),\ldots,SINR_L(W^i,W^i_{N2}))) \quad \text{[Math.14]}$$

Similarly, the objective function is defined by one of equations 5 to 7, and the SINR is given by:

MathFigure 15

$$SINR_l(W^i, W^i_{N2}) = \frac{|U(l)H(W^i(l))^H|^2 \frac{P}{L}}{N_0 + \sum_{k \neq l}^{L} |U(l)H(W^i(k))^H|^2 \frac{P}{L} + \|U(l)H_{N1}V_{N1}\|^2 \frac{P_{N1}}{L_{N1}} + \|U(l)H_{N2}\text{null}(W^i_{N2})\|^2 \frac{P_{N2}}{Nt_{N2}-L}} \quad \text{[Math. 15]}$$

where U(l) and $W^i(l)$ are l-th row vector of the matrixes, respectively.

A MMSE reception beam forming matrix $U_{MMSE}$ is determined as follow:

MathFigure 16

$$U_{MMSE}=(H(W^i)^H)^H(G)^{-1} \quad \text{[Math.16]}$$

where G=$H(W^i)^H(H(W^i)^H)^H$ P/L+$H_{N1}V_{N1}(H_{N1}V_{N1})^H$ $P_{N1}$/$L_{N1}$+$H_{N2}$ null($W^i_{N2}$)($H_{N2}$ null($W^i_{N2}$))$^H$ $P_{N2}$/($Nt_{N2}$−L)+$N_0 I_{Nr}$.

As disclosed in the first embodiment, it is possible to calculate U that maximizes the objective function by applying the constraint of the equation 11.

In the first to third embodiments described above, a downlink communication environment with one amicable cooperative cell and one non-amicable cooperative cell was exemplified to describe multi cell cooperation communication. The present invention, however, is not limited thereto and may be applied when one or more non-amicable cooperative cells exist.

When m non-amicable cooperative cells exist, the reception beam forming matrix set by each cell is reported to the serving cell and/or the UE. The UE determines the reception beam forming matrix and CQI by applying the embodiments described above.

Further, inter-cell cooperation is possible when only the non-amicable cooperative cell exists, without the amicable cooperative cell. That is, the same way can be applied, after the reception power from the amicable cooperative cell is set to 0 in the first and second embodiments.

Although it is assumed that SU-MIMO (Single User-MIMO) has one UE where CoMP is applied, the present invention may be applied in the same way to MU-MIMO (Multi User-MIMO).

Figure 3:
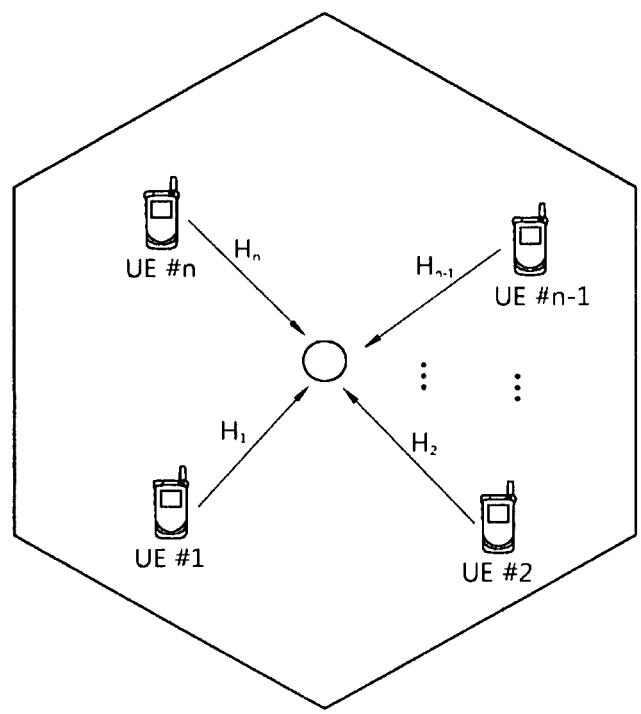
FIG. 3 is a diagram showing an example of uplink MU-MIMO communication.

FIG. 3 is a diagram showing an example of uplink MU-MIMO communication. Assume that there are n UEs in the cell.

Assume that transmission beam $V_n$ of UE #n is determined first to ensure QoS of the UE #n. The BS can adjust transmission beam of UE #2, . . . , UE #n−1 to increase transmission rate of the UE #1.

For example, it is possible to adjust $V_2$, . . . , $V_{n-1}$ to be aligned with $H_n V_n$ with respect to the uplink channels $_2 V_2$, . . . , $H_{n-1} V_{n-1}$ where the transmission beam of UE #2, . . . , UE #n−1 is applied. Therefore, it is possible to allow the UE #1 to effectively control an interference signal through beam forming.

Transmission beam forming information informed to the serving cell and the SU from the non-amicable cooperative cell is described below. The transmission beam forming information is information on a precoding matrix or a beam forming matrix used for beam forming for the UE in the non-amicable cooperative cell. The transmission beam forming information informed to the serving cell and the SU from the non-amicable cooperative cell may be one of the following three.

First, the transmission beam forming information may be a value obtained by quantizing a precoding matrix (e.g. $V_{N1}$) that is used for downlink transmission of the non-amicable cooperative cell, using a codebook. The non-amicable cooperative cell determines the precoding matrix by using a MIMO beam forming technique, such as Zero facing, on the basis of PMI acquired from its own UEs. A codeword in a codebook corresponding to the determined precoding matrix is selected, thereby including the codeword into the transmission beam forming information.

Second, the transmission beam forming information may be a PMI value fed-back to the non-amicable cooperative cell from the user equipment scheduled in the non-amicable cooperative cell. The PMI fed-back from each UE may include a wide-band PMI representing channel information for a long-period wide band and a subband PMI representing channel information for a short-period subband. The transmission beam forming information may include at least any one of the wide-band PMI and the subband PMI.

Third, the transmission beam forming information may include a value obtained by multiplying the channel $H_{N1}$ between the UE of the non-amicable cooperative cell and the serving cell by the precoding cell of the non-amicable cooperative cell, that is information on the downlink effective channel.

The non-amicable cooperative cell transmits a precoded reference signal with the precoding matrix to the SU. The SU can estimate a downlink effective channel from the non-amicable cooperative cell, using the precoded reference signal. Unlike the first and second embodiments, this indirectly informs transmission beam forming information to the SU through wireless communication.

The UE is required to know reference signal information on the precoded reference signal of the non-amicable cooperative cell in order to receive the precoded reference signal of the non-amicable cooperative cell. The reference signal information includes a reference signal index, a cell index, and a reference signal patterns etc. The reference signal information may be informed to the serving cell by the non-amicable cooperative cell and may be informed to the SU by the serving cell. Alternatively, the non-amicable cooperative cell can transmit a precoded reference signal to the SU by using a predetermined radio resource. This does not need any signaling.

Figure 4:
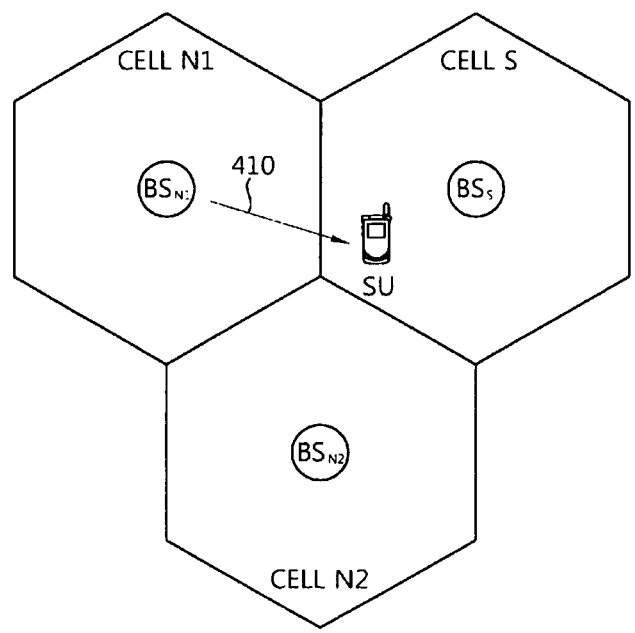
FIG. 4 is a diagram showing an example when a non-amicable cooperative cell transmits transmission beam forming information.

FIG. 4 shows an example when a non-amicable cooperative cell transmits beam forming information.

The non-amicable cooperative cell N1 transmits transmission beam forming information to the SU through a direct wireless channel 410. The direct wireless channel 410 is a wireless channel defined to carry transmission beam forming information between the non-amicable cooperative cell N1 and the SU.

The wireless channel may be a precoded reference signal, when the transmission beam forming information informed to the serving cell and the SU from the non-amicable cooperative cell is downlink effective channel information.

Figure 5:
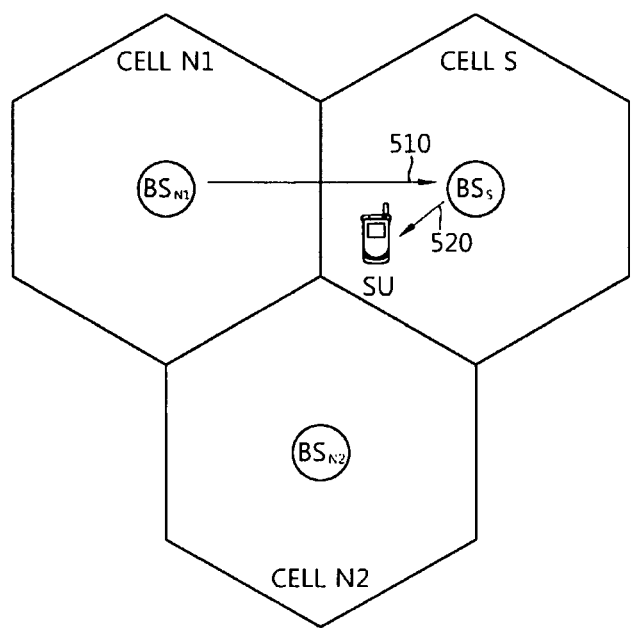
FIG. 5 is a diagram showing another example when a non-amicable cooperative cell transmits transmission beam forming information.

FIG. 5 is a diagram showing another example when a non-amicable cooperative cell transmits transmission beam forming information.

The non-amicable cooperative cell N1 transmits transmission beam forming information to the serving cell S through a wire channel 510. The serving cell S transmits transmission beam forming information to the SU through a wireless channel 520.

It is possible to use various wireless channels defined between the serving cell S and the SU to transmit the transmission beam forming information.

Hereinafter, physical channels of the conventional 3GPP LTE system are disclosed.

As disclosed in 3GPP TS 36.211 V8.7.0 (2009-05) "Evolved Universal Terrestrial Radio Access (E-UTRA); Physical Channels and Modulation (Release 8)", the physical channel of 3GPP LTE can be divided into a PDSCH (Physical Downlink Shared Channel) and a PUSCH (Physical Uplink Shared Channel), which are data channels, and a PDCCH (Physical Downlink Control Channel), a PCFICH Physical Control Format Indicator Channel), a PHICH (Physical Hybrid-ARQ Indicator Channel), and a PUCCH (Physical Uplink Control Channel), which are control channels.

Control information transmitted through the PDCCH is called downlink control information (DCI). The DCI may includes resource allocation of PDSCH (called DL grant), resource allocation of PUSCH (called UL grant), a set of transmission power control commands for each UE in a predetermined UE group and/or activation of VoIP (Voice over Internet Protocol).

Figure 6:
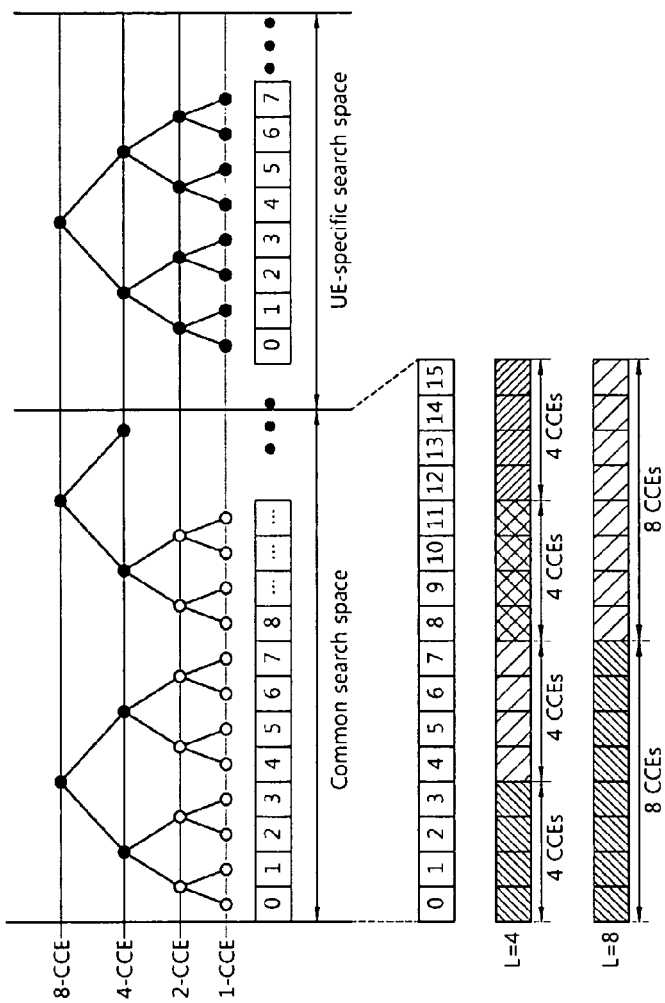
FIG. 6 is an exemplary diagram showing monitoring of PDCCH in 3GPP LTE.

FIG. 6 is an exemplary diagram showing monitoring of PDCCH in 3GPP LTE. This may refer to section 9 in 3GPP TS 36.213 V8.7.0 (2009-05).

Blind decoding is used to detect PDCCH in 3GPP LTE. The blind decoding is a method ascertaining whether PDCCH is its own control channel, by demasking a particular identifier to CRC of received PDCCH (referred to as a candidate of PDCCH)) and checking an CRC error.

A plurality of PDCCHs may be transmitted from one sub-frame. The UE monitors the PDCCHs for each sub-frame. In this configuration, the monitoring is that the UE tries decoding the PDCCH in accordance with the PDCCH format that is monitored.

A search space is used to reduce load due to the blind decoding in 3GPP LTE. The search space may be considered as a monitoring set of CCE (Control Channel Element) for PDCCH. The UE monitors PDCCH in the search space.

The search space is divided into a common search space and a UE-specific search space. The common search space, which is a space for searching PDCCH having common control information, is composed of 16 CCEs of CCE index 0~15 and supports PDCCH having a CCE aggregation level of {4, 8}. However, PDCCH (DCI format 0, 1A) carrying UE-specific information may be transmitted to the common search space. The UE-specific search space supports PDCCH having a CCE aggregation level of (1, 2, 4, 8).

The following Table 1 shows the number of PDCCH candidates that are monitored by the UE.

TABLE 1

| Search Space Type | Aggregation level L | Size [in CCEs] | Number of PDCCH candidates | DCI formats |
|---|---|---|---|---|
| UE-specific | 1 | 6 | 6 | 0, 1, 1A, 1B, |
|  | 2 | 12 | 6 | 1D, 2, 2A |
|  | 4 | 8 | 2 |  |
|  | 8 | 16 | 2 |  |
| Common | 4 | 16 | 4 | 0, 1A, 1C, |
|  | 8 | 16 | 2 | 3/3A |

The size of the search space depends on Table 1 and the start point of the search space is defined differently in the common search space and the UE-specific search space. The start point of the common search space is fixed regardless of the sub-frame; however, the start point of the UE-specific search space may depend on a user identifier (e.g. C-RNTI), a CCE aggregation level, and/or the slot number of a wireless frame, for each sub-frame. When the start point of the UE-specific search space is in the common search space, the UE-specific search space may overlap the common search space.

The transmission beam forming information may be transmitted on the PDCCH. In this process, PDCCH carrying the transmission beam forming information may be monitored in the common search space or monitored in the UE-specific search space. According to the former, all of the UE in the serving cell can receive the transmission beam forming information, which is CRC-masked to a cell ID or a common ID in the serving cell. According to the later, only specific UE can receive the transmission beam forming information, which may be CRC-masked to a UE ID of the SU.

Alternatively, the transmission beam forming information may be transmitted to the UE in the cell through a broadcast channel. The UE receiving the transmission beam forming information can selectively generate/report serving cell channel feedback information and/or amicable cooperative cell feedback information for cooperation communication.

Figure 7:
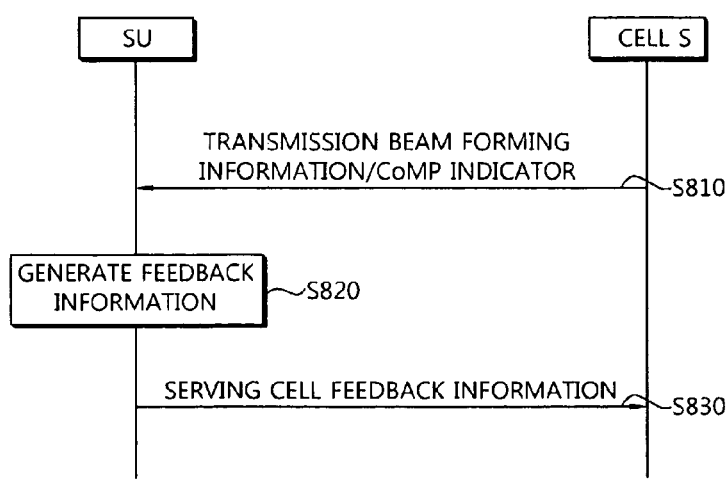
FIG. 7 is a diagram illustrating a feedback information transmission method according to an embodiment of the present invention.

FIG. 7 is a diagram illustrating a feedback information transmission method according to an embodiment of the present invention.

The SU receives transmission beam forming information and/or the CoMP indicator from the serving cell S through PDCCH (S810). The SU can monitor PDCCH in the common search space or the UE-specific search space.

The UE generates feedback information (S820). Feedback information according to the embodiment shown in FIG. 2, which is described above, may be generated.

The UE reports the generated serving cell feedback information to the serving cell S (S830).

The CoMP indicator indicates whether to generate a channel state information (CSI) (hereafter, referred to as CoMP CSI) of the serving cell in consideration of interference from the non-amicable cooperative cell or generate a CSI (hereafter, referred to as non-CoMP CSI) not considering the interference.

If the serving cell does not inform the CoMP indicator, the SU may determine by itself to generate which CSI. The SU generates the CoMP CSI, when a difference of the average reception power of the serving cell and the non-amicable cooperative cell decreases below a threshold. The UE finds PMI of V in which $H_{N1}V_{N1}$ and HV are maximally orthogonal and feed-backs it to the serving cell.

When PDCCH is transmitted in the common search space, the CoMP indicator may be in a bitmap format. When N UEs exist, it is possible to determine CSI calculation method of each UE through N-bit bitmap.

When PDCCH is transmitted in the UE-specific search space, the CoMP indicator may be a one-bit flag or may reuse the bit in a reference DCI format. For example, when the value of the CoMP indicator is 1, the CoMP CSI is calculated, or when it is 0, the non-CoMP CSI is calculated.

Alternatively, the UE feed-backs the CoMP CSI, when receiving transmission beam forming information of the non-amicable cell through PDCCH, or may feed-backs the non-CoMP CSI when not receiving the transmission beam forming information. PDCCH may be monitored in the UE-specific search space.

A technique of transmitting cooperative cell feedback information for amicable cooperative cell is described hereafter.

Figure 8:
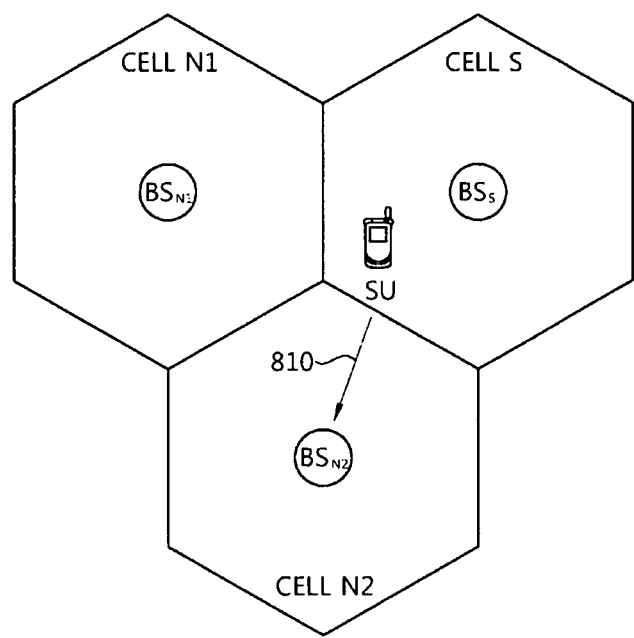
FIG. 8 is a diagram showing an example when a user equipment transmits cooperative cell feedback information to an amicable cooperative cell.

FIG. 8 is a diagram showing an example when a UE transmits cooperative cell feedback information to an amicable cooperative cell.

A SU transmits cooperative cell feedback information to the amicable cooperative cell N2 through a direct wireless channel 810. The direct wireless channel 810 is a wireless channel defined to carry cooperative feedback information between the amicable cooperative cell N2 and the SU.

The cooperative cell feedback information may include information on a precoding matrix that is used for beam forming by the amicable cooperative cell Alternatively, the SU can indirectly inform the cooperative cell feedback information, using transmission of a reference signal. For example, the SU transmits an SRS (sounding reference signal) and a precoded SRS in a precoding matrix of the amicable cooperative cell to the amicable cooperative cell. The amicable cooperative cell finds PMI of the amicable cooperative cell which is calculated by the SU on the basis of the precoded SRS.

To coincide a matrix dimension for $V_{N2}$ of the amicable cooperative cell with a matrix dimension for a channel $(H_{N2})^H$ between the SU and the amicable cooperative cell N2, transformation is required as given by:

MathFigure 17

$$V_{N2}'=\text{norm}[\text{padding}[(V^c_{N2}(1:\min(Nr,L_{N1})))^H]] \quad \text{[Math.17]}$$

where $V_{N2}'$ is a transformed precoding matrix, Nr is the number of transmitting antennas of the SU, $L_{N1}$ is the rank of the non-amicable cooperative cell (the number of columns of the precoding matrix of the non-amicable cooperative cell), and $a^c(1:x)$ is a matrix composed of column vectors from the first column and the x column in the matrix a. Padding 'a' is a function that makes the matrix a have Nr rows, by filling the other rows with a predetermined dummy value, when the number or row of the matrix a is smaller than Nr. Norm[a] normalizes the magnitude of the matrix a to 1.

For example, when Nr=4, $L_{N1}$=2, $V_{N2}'$ is given by:

MathFigure 18

$$V_{N2}' = \text{norm}\left[\begin{bmatrix} V^c_{N2}(1)^H \\ V^c_{N2}(2)^H \\ d_3 \\ d_4 \end{bmatrix}\right] \quad \text{[Math. 18]}$$

where $d_i$ is a value that both of the SU and the amicable cooperative cell N2 know, and for example, may be the i-th row of an identity matrix.

The amicable cooperative cell N2 receiving the SRS and precoding SRS from the SU can estimate an uplink channel $(H_{N2})^H$ from the SRS and estimate an uplink effective channel $(H_{N2})_H V_{N2}'$ from the precoded SRS.

Next, by multiplying the inverse matrix of the channel estimated from the SRS and the channel estimated from the precoded SRS, it is possible to estimate $V_{N2}'$ as follows:

MathFigure 19

$$V_{N2}'=((H_{N2})^H)^{-1}(H_{N2})^H V_{N2}' \quad \text{[Math.19]}$$

The amicable cooperative cell N2 calculating $V_{N2}'$ finds $V^c_{N2}(1:\min(Nr, L_{N1}))$, ignoring the padded dummy value.

When Nr<$L_{N1}$, the $V^c_{N2}(1:\min(Nr, L_{N1}))$ found by the amicable cooperative cell N2 loses some of column vectors of $V_{N2}$. Therefore, it is possible to restrict the downlink effective channel of the amicable cooperative cell N2 within a subspace of the downlink effective channel of the non-amicable cooperative cell N1.

When $V_{N2}'$ is composed as described above, dummy precoding is also transmitted, such that overhead of the precoded SRS may increase. To overcome this problem, $V_{N2}'$ may be replaced by $V_{N2}''$ as follows:

MathFigure 20

$$V_{N2}''=[H^R_{N2}(1:Nr)H^R_{N2}(Nr+1:2Nr)\ldots H^R_{N2}(mNr+1:Nr)] \quad \text{[Math.20]}$$

where $H^R_{N2}(m:n)$ is a matrix composed of the m rows and the n rows of matrix $H_{N2}$ and Nr is the number of antennas of the SU, and Nt is the number of antennas of the cell.

It is possible to perform transmission by using some of column vector of $V_{N2}''$ to more reduce overhead of the additional precoded SRS. In this case, since some of the column vector of $V_{N2}$ is lost in $V_{N2}''$, the downlink effective channel of the amicable cooperative cell is restricted to exist in a partial subspace, not the entire space of the downlink effective channel of the non-amicable cooperative cell.

For example, when Nt=4, $L_{N1}$=1, and Nr=2, $V_{N2}''$ is configured as follows:

MathFigure 21

$$V_{N2} = [c1 \quad c2 \quad c3 \quad c4]^T, \quad \text{[Math. 21]}$$
$$V_{N2}'' = \begin{bmatrix} c1 & c3 \\ c2 & c4 \end{bmatrix}.$$

where $A^T$ is a transpose matrix of a matrix A and c1, c2, c3, and c4 are complex numbers.

The SRS and the precoded SRS information do not need to be transmitted in the cooperative frequency band where the inter-cell cooperation occurs, because it is not the object to measure a channel, using them. Therefore, they may be transmitted through PUCCH regardless of the cooperative frequency band, but the cooperative time information, such as the cooperative frequency band and the sub-frame number, is required to be shared between the cells. Accordingly, it is possible for the SU to transmit cooperative resource information to the amicable cooperative cell through a wireless channel, such as PUCCH.

The SRS and the precoded SRS information may be transmitted by using an orthogonal resource to normally operate the technique. For example, SRS and precoded SRS information may be transmitted from different sub-frames.

Figure 9:
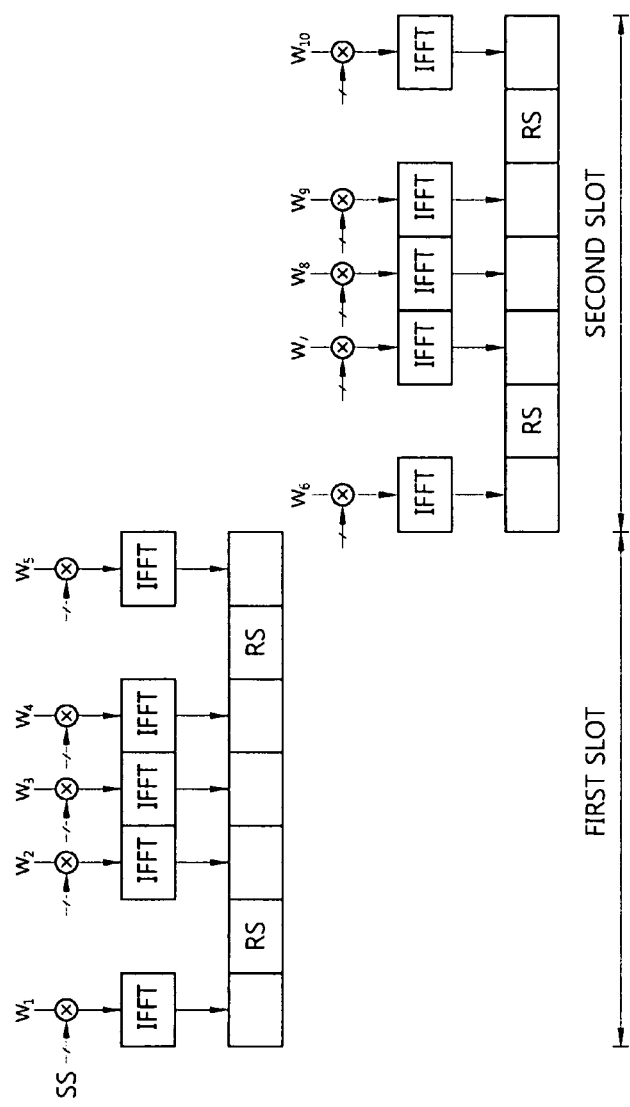
FIG. 9 is a diagram showing an example of transmitting precoding matrix through PUCCH.

PUCCH may be used for more efficient transmission of information. FIG. 9 is a diagram showing an example of transmitting precoding matrix through PUCCH. Each element of a precoding matrix is carried on payload of PUCCH format 2 that is used for transmission of CQI.

When the number of elements of the precoded matrix are 10, symbols representing them $w_1, w_2, \ldots, w_{10}$ are generated. The symbols are spread and transmitted by spreading sequence (SS). The spread sequence is achieved by circulation-shifting a base sequence.

The amicable cell N2 can directly obtain information on the precoding matrix transmitted from the UE through PUCCH.

According to another example, inverse matrix calculation, as in equation 19, was performed to estimate the precoding matrix from the effective channel in the above operation. However, it is possible to more simply estimate the precoding matrix as compared with the precoding matrix is quantized into a codebook type. An effective channel is generated by multiplying the uplink channel estimated from an uplink reference signal by all codewords in the codebook, and then it is possible to estimate the precoding matrix to the closest value by comparing the effective channel with the effective channel substantially estimated by the amicable cell N2.

Figure 10:
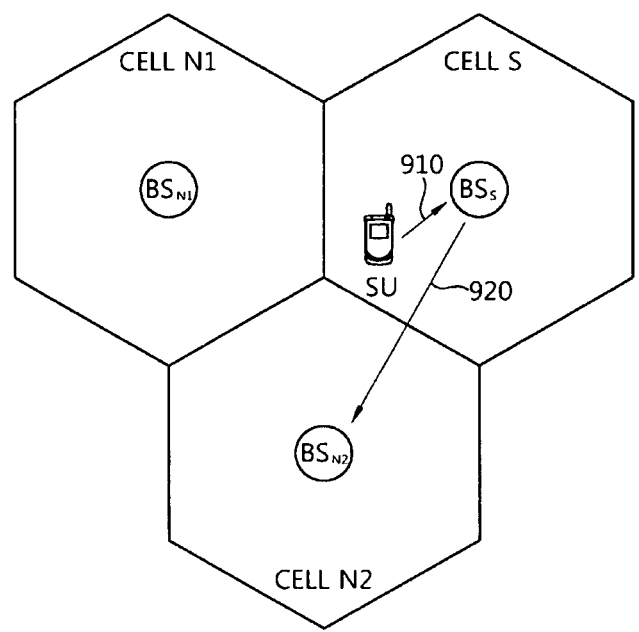
FIG. 10 is a diagram showing another example when a user equipment transmits cooperative cell feedback information to an amicable cooperative cell.

FIG. 10 is a diagram showing another example when a UE transmits cooperative cell feedback information to an amicable cooperative cell.

A SU transmits cooperative cell feedback information to the serving cell S through an uplink wireless channel 910. The serving cell S transmits the cooperative cell feedback information to the amicable cooperative cell N2 through a wire channel 920.

According to the method of multi cell cooperation of the present invention, which was described above, it is possible to provide higher performance service to cells that are likely to interfere with other cells, such as a micro cell existing in the coverage of a macro cell under a heterogeneous network environment or a CSG (closed subscribed group) cell.

Figure 11:
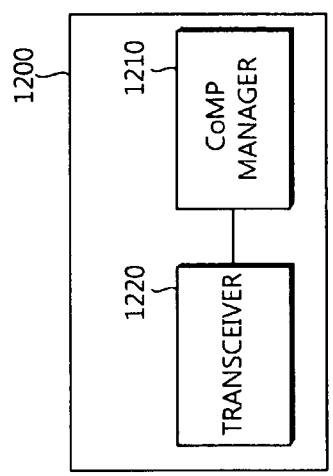
FIG. 11 is a block diagram showing a wireless communication system that is implemented by an embodiment of the present invention.
Figure 11:
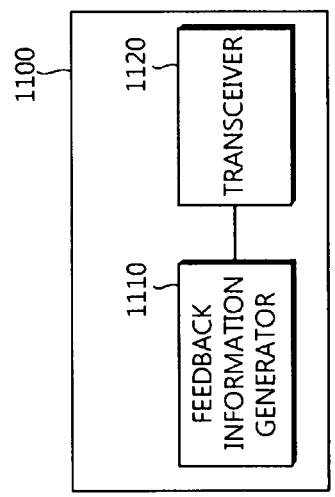

FIG. 11 is a block diagram showing a wireless communication system to implement embodiments of the present invention.

A UE 1100 includes a feedback information generator 1110 and a transceiver 1120. The feedback information generator 1110 generates the serving cell feedback information and the cooperative cell feedback information in the embodiments shown in FIGS. 2 to 10, on the basis of transmission beam forming information of the non-amicable cooperative cell. The transceiver 1120 receives the transmission beam forming information and transmits the serving cell feedback information and cooperative cell feedback information.

The feedback information generator 1110 and the transceiver 1120 may be implemented by a processor. When the embodiment is implemented by software, the technique described above may be implemented by a module (process and function etc.) performing the functions described above. The module is stored in a memory and may be executed by a processor.

A BS 1200 includes a CoMP manager 1210 and a transceiver 1220. The BS 1200 may be a serving cell BS or a cooperative cell BS. When the BS 1200 is a serving cell BS, the BS 1200 performs the operation of the serving cell in the embodiments shown in FIGS. 2 to 10. When the BS 1200 is a cooperative cell BS, the BS 1200 performs the operation of the non-amicable cooperative cell or the amicable cooperative cell in the embodiments shown in FIGS. 2 to 10.

The CoMP manager 1210 performs the operation for multi cell cooperation in the embodiments shown in FIGS. 2 to 10. When the BS 1200 is a serving cell BS, the CoMP manager 1210 performs the CoMP operation on the basis of the serving cell feedback information. When the BS 1200 is a non-amicable cooperative cell BS, the CoMP manager 1210 determines transmission beam forming information. When the BS 1200 is an amicable cooperative cell BS, the CoMP manager 1210 performs the CoMP operation on the basis of the cooperative cell feedback information.

The transceiver 1220 may transmit the transmission beam forming information or receive the cooperative cell feedback information.

The CoMP manager 1210 and the transceiver 1220 may be implemented by a processor. When the embodiment is implemented by software, the technique described above may be implemented by a module (process and function etc.) performing the functions described above. The module is stored in a memory and may be executed by a processor.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations.

The invention claimed is:

1. A method of multi cell cooperation in a user equipment (UE), comprising:
receiving, by the UE, transmission beam forming information from a first cooperative cell;
generating, by the UE, serving cell feedback information and cooperative cell feedback information based on the transmission beam forming information;
transmitting, by the UE, the serving cell feedback information to a serving cell; and
transmitting, by the UE, the cooperative cell feedback information to a second cooperative cell, wherein the transmission beam forming information includes information on a first precoding matrix used by the first cooperative cell, wherein the cooperative cell feedback information includes information on a second precoding matrix selected such that a first channel direction matches with a second channel direction, the first channel direction being defined between the second cooperative cell and the UE, the second channel direction being defined between the first cooperative cell and the UE, and wherein the first precoding matrix is applied to the first cooperative cell.

2. The method according to claim 1, wherein the serving cell feedback information includes information on a precoding matrix determined to have the highest signal to interference and noise ratio (SINR) when the first precoding matrix and the second precoding matrix are applied.

3. The method according to claim 2, wherein the determined precoding matrix is determined to exist in a null space of a channel between the UE and the first cooperative cell where the first precoding matrix is applied.

4. The method according to claim 1, wherein the serving cell feedback information includes information on a precoding matrix determined to have the highest signal to interference and noise ratio (SINR), when the first precoding matrix is applied.

5. The method according to claim 4, wherein the determined precoding matrix is determined to exist in a null space of a channel between the UE and the first cooperative cell where the first precoding matrix is applied.

6. The method according to claim 1, wherein the transmission beam forming information is transmitted through a Physical Downlink Control Channel (PDCCH).

7. The method according to claim 1, wherein the transmission beam forming information is transmitted through a precoded reference signal where the first precoding matrix used by the first cooperative cell is applied.

8. The method according to claim 1, further comprising:
receiving, by the UE, a cooperative multiple point transmission and reception (CoMP) indicator that indicates whether to generate the serving cell feedback information in consideration of the transmission beam forming information.

9. The method according to claim 1, wherein the cooperative cell feedback information is transmitted through a precoded sounding reference signal (SRS) where the second precoding matrix, which is used by the second cooperative cell, is applied.

10. The method according to claim 1, further comprising:
determining, by the UE, whether to transmit at least one of amicable cooperative cell feedback information or serving cell channel feedback information for the cooperation communication.

11. A user equipment (UE) comprising:
a transceiver configured to receive transmission beam forming information from a first cooperative cell, transmit serving cell feedback information to a serving cell, and transmit cooperative cell feedback information to a second cooperative cell; and
a feedback information generator configured to generate the serving cell feedback information and the cooperative cell feedback information based on transmission beam forming information, wherein the transmission beam forming information includes information on a first precoding matrix that is used by the first cooperative cell, wherein the cooperative cell feedback information includes information on a second precoding matrix selected such that a first channel direction matches with a second channel direction, the first channel direction being defined between the second cooperative cell and the UE, the second channel direction being defined between the first cooperative cell and the UE, and wherein the first precoding matrix is applied to the first cooperative cell.

12. The UE according to claim 11, wherein the serving cell feedback information includes information on a precoding matrix determined to have the highest signal to interference and noise ratio (SINR) when the first precoding matrix and the second precoding matrix are applied.

* * * * *